United States Patent
Hong et al.

(10) Patent No.: US 9,891,067 B2
(45) Date of Patent: Feb. 13, 2018

(54) VOICE TRANSMISSION STARTING SYSTEM AND STARTING METHOD FOR VEHICLE

(71) Applicant: Hyundai Motor Company, Seoul (KR)

(72) Inventors: Gi Beom Hong, Gyeonggi-do (KR); Sung Un Kim, Gyeonggi-do (KR); Kwang Myung Oh, Daejeon (KR); Jungsang Min, Seoul (KR)

(73) Assignee: Hyundai Motor Company, Seoul (KR)

( * ) Notice: Subject to any disclaimer, the term of this patent is extended or adjusted under 35 U.S.C. 154(b) by 122 days.

(21) Appl. No.: 14/144,164

(22) Filed: Dec. 30, 2013

(65) Prior Publication Data

US 2014/0278442 A1  Sep. 18, 2014

(30) Foreign Application Priority Data

Mar. 15, 2013 (KR) .......................... 10-2013-0027958

(51) Int. Cl.
| | |
|---|---|
| *H04R 3/00* | (2006.01) |
| *G10L 21/00* | (2013.01) |
| *G06F 7/00* | (2006.01) |
| *G01C 21/36* | (2006.01) |
| *B60R 16/037* | (2006.01) |

(52) U.S. Cl.
CPC ...... *G01C 21/3608* (2013.01); *B60R 16/0373* (2013.01)

(58) Field of Classification Search
CPC ........... H04R 3/00; H04R 1/326; G10L 21/00; G06F 7/00
USPC ..................... 704/275; 345/156, 177; 381/92
See application file for complete search history.

(56) References Cited

U.S. PATENT DOCUMENTS

| | | | | |
|---|---|---|---|---|
| 6,513,833 B2* | 2/2003 | Breed | ...................... | B60J 10/00 180/272 |
| 8,907,929 B2* | 12/2014 | Li | .......................... | G01S 7/5273 345/177 |
| 2007/0057781 A1* | 3/2007 | Breed | .................... | B60K 35/00 340/457.1 |
| 2008/0065291 A1* | 3/2008 | Breed | .................... | B60N 2/002 701/36 |

(Continued)

FOREIGN PATENT DOCUMENTS

| | | |
|---|---|---|
| CN | 1396520 A | 2/2003 |
| KR | 10-2010-0061890 A | 6/2010 |
| KR | 10-2011-0084748 A | 7/2011 |
| KR | 10-2011-0117966 A | 10/2011 |
| KR | 10-2012-0101604 A | 9/2012 |

OTHER PUBLICATIONS

Gupta et al., "SoundWave: Using the Doppler Effect to Sense Gestures", Processding of ACM CHI 2012, May 2012, pp. 1911-1914.*

(Continued)

*Primary Examiner* — Seong Ah A Shin
(74) *Attorney, Agent, or Firm* — Mintz Levin Cohn Ferris Glovsky and Popeo, P.C.; Peter F. Corless

(57) ABSTRACT

A voice transmission starting system and starting method for a vehicle are provided to start a voice transmission device through recognition of a motion. The method includes outputting, by a controller, an ultrasonic wave having substantially uniform amplitude and recognizing the output ultrasonic wave as an input. In addition, the controller generates a signal based on information regarding the recognized ultrasonic wave and transmits the signal to start the voice transmission device.

4 Claims, 3 Drawing Sheets

(56) References Cited

U.S. PATENT DOCUMENTS

| | | | | |
|---|---|---|---|---|
| 2010/0121636 | A1* | 5/2010 | Burke | G06F 3/0346 704/233 |
| 2011/0260965 | A1* | 10/2011 | Kim | G06F 3/013 345/156 |
| 2012/0001875 | A1* | 1/2012 | Li | G01S 7/5273 345/177 |
| 2012/0134507 | A1* | 5/2012 | Dimitriadis | H04R 3/00 381/92 |
| 2012/0194483 | A1* | 8/2012 | Deluca | G06F 1/1643 345/177 |
| 2013/0114380 | A1* | 5/2013 | Bryger | G06F 1/325 367/199 |
| 2013/0155031 | A1* | 6/2013 | Dahl | G06F 3/0412 345/177 |
| 2013/0301391 | A1* | 11/2013 | Altman | G01S 13/003 367/100 |
| 2014/0177939 | A1* | 6/2014 | Lo | H05K 1/0269 382/147 |

OTHER PUBLICATIONS

Gupta, Sidhant, et al. "Soundwave: using the doppler effect to sense gestures." Proceedings of the SIGCHI Conference on Human Factors in Computing Systems. ACM, 2012.*

Kaustubh et al., "One-handed Gesture Recognition using Ultrasonic Doppler Sonar", Acoustics, Speech and Signal Processing, 2009.*

Gupta et al. "Soundwave: using the doppler effect to sense gestures." Proceedings of the SIGCHI Conference on Human Factors in Computing Systems. ACM, 2012.*

Gupta et al., (SoundWave: Using the Doppler Effect to Sense Gestures, Processding of ACM CHI 2012, May 2012, pp. 1911-1914).*

Kalgaonkar et al., "One-handed gesture recognition using ultrasonic Doppler sonar." Acoustics, Speech and Signal Processing, 2009. ICASSP 2009. IEEE International Conference on. IEEE, 2009.*

Gupta, S. et al., "SoundWave: Using the Doppler Effect to Sense Gestures", Proceedings of ACM CHI 2012, May 2012.

* cited by examiner

VOICE TRANSMISSION STARTING SYSTEM AND STARTING METHOD FOR VEHICLE

CROSS-REFERENCE TO RELATED APPLICATION

This application claims priority to and the benefit of Korean Patent Application No. 10-2013-0027958 filed in the Korean Intellectual Property Office on Mar. 15, 2013, the entire contents of which are incorporated herein by reference.

BACKGROUND (a) Field of the Invention

The present invention relates to a voice transmission starting system and a starting method for a vehicle, and more particularly, to a voice transmission device for a vehicle operated by recognizing a motion of a driver, and a voice transmission starting method for a vehicle.

(b) Description of the Related Art

In general, a voice transmission device for a vehicle is utilized for a hands-free telephone and an operation of a device through voice recognition. An example of the voice transmission device for a vehicle includes push to talk (PTT) and a voice recognition apparatus.

The PTT is a type of radio service in which a portable phone is usable similar to a handheld transceiver, and is a service in which when a person presses one button, several people may simultaneously hear the voice of the person through the portable phone. When the PTT is applied to a vehicle, a voice of a calling counterpart is transmitted to a driver and a passenger via a speaker within the vehicle, and voices of the driver and the passenger are transmitted to the calling counterpart via a microphone within vehicle. Further, the voice recognition apparatus is an apparatus that operates various devices based on a voice command. When the voice recognition apparatus is applied to the vehicle, safe driving may be maintained, allowing the user to conveniently operate various devices.

However, when the PTT and the voice recognition apparatus are started through a button, a driver needs to press the button to operate the PTT and the voice recognition apparatus. Additionally, a risk of failing to maintain a forward gaze when pressing the button while driving occurs. In particular, the method may cause erroneous voice recognition when voice recognition units of the PTT and the voice recognition apparatus are constantly operated.

The above information disclosed in this section is merely for enhancement of understanding of the background of the invention and therefore it may contain information that does not form the prior art that is already known in this country to a person of ordinary skill in the art.

SUMMARY

The present invention provides a voice transmission starting system and a starting method for a vehicle, which starts a voice transmission device by recognition of a motion.

An exemplary embodiment of the present invention provides a voice transmission starting system for a vehicle that may include: a sound wave generating device configured to output an ultrasonic wave that has substantially uniform amplitude; a sound wave detecting device in which the ultrasonic wave output from the sound wave generating device is input; a central processing device configured to receive information regarding the ultrasonic wave input in the sound wave detecting device from the sound wave detecting device, analyze the received information regarding the ultrasonic wave, and transmit a signal based on an analysis result; a controller configured to receive the signal transmitted from the central processing device, and output a control command to start a voice transmission device based on the received signal; and an operating unit configured to start the voice transmission device based on the command received from the controller.

The sound wave generating device may be configured to simultaneously output the ultrasonic wave when the vehicle starts, and output the ultrasonic wave while the vehicle is driven. An operation of the sound wave detecting device that inputs the ultrasonic wave may be simultaneously performed with the output of the ultrasonic wave by the sound wave generating device, and the ultrasonic wave may be input until the voice transmission device may be started. An intention of a driver to start the voice transmission device may be transmitted to the central processing device based on a gesture on a path of the ultrasonic wave transmitted from the sound wave generating device to the sound wave detecting device.

The central processing device may include a determination unit configured to analyze the information regarding the ultrasonic wave and determine a driver intention, and a transmitter configured to transmit a signal based on the driver intention. The amplitude of the ultrasonic wave may be changed due to interference by a gesture of the driver, and the central processing device may be configured to determine the driver intention based on information regarding the ultrasonic wave of which the amplitude is changed. The sound wave generating device may be a speaker mounted within the vehicle. The sound wave detecting device may be a microphone mounted within the vehicle for voice recognition.

Another exemplary embodiment of the present invention provides a voice transmission starting method for a vehicle that may include: outputting, by a controller, an ultrasonic wave; recognizing, by the controller, the output ultrasonic wave; generating, by the controller, a signal based on information regarding the recognized ultrasonic wave and transmitting the generated signal; and executing, by the controller, an operation to start a voice transmission device based on the transmitted signal.

When a driver performs a gesture on a path of the ultrasonic wave, the amplitude of the output ultrasonic wave may be changed by the gesture, and the ultrasonic wave of may be recognized. The voice transmission starting method may further include determining, by the controller, a driver intention to start the voice transmission device based on information regarding the recognized ultrasonic wave. In response to determining an intention to start the voice transmission device, a signal may be generated based on the information regarding the recognized ultrasonic wave and the generated signal may be transmitted. The output of the ultrasonic wave and the recognition of the ultrasonic wave may be repeated when an intention to start the voice transmission device is not detected.

| Description of symbols | |
|---|---|
| 10: Sound wave generating device | 20: Sound wave detecting device |
| 30: Central processor (CPU) | 32: Determination unit |
| 34: Transmitter | 40: Controller |
| 50: Operating unit | 60: Voice transmission device |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

Figure 1:
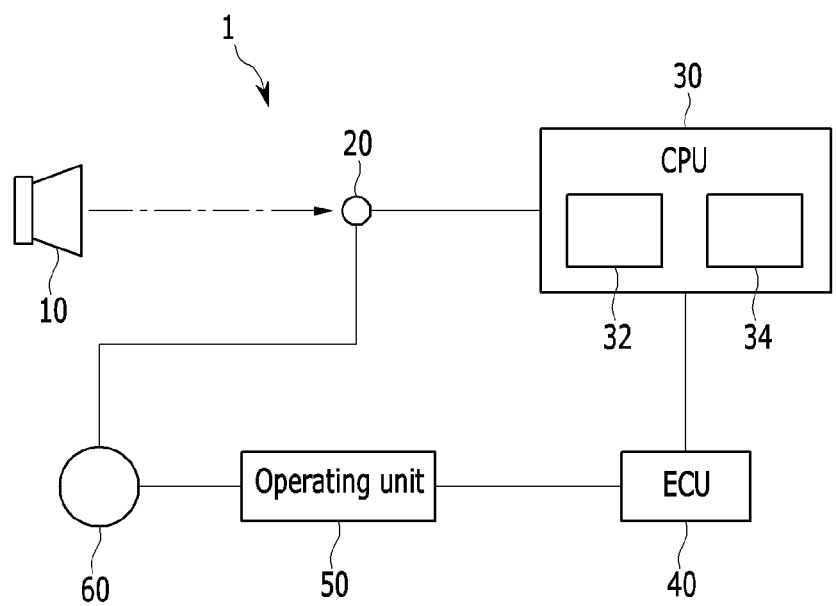
FIG. 1 is an exemplary schematic diagram of a voice transmission starting system for a vehicle according to an exemplary embodiment of the present invention.

FIG. 1 is an exemplary schematic diagram of a voice transmission starting system for a vehicle according to an exemplary embodiment of the present invention. As illustrated in FIG. 1, a voice transmission starting system 1 for a vehicle may include a voice transmission device 60, a sound wave generating device 10, a sound wave detecting device 20, a central processor (CPU) 30, a controller 40, and an operating unit 50. The controller 40 may be configured to operate the voice transmission device 60, the sound wave generating device 10, the sound wave detecting device 20, the central processor 30, and the operating unit 50.

The voice transmission device 60 may be configured to transmit a voice of a driver to a voice recognition apparatus that operates various devices based on a command by the voice of the driver, or a device, such as a speaker phone, configured to transmit the voice of the driver to operate a call function.

The sound wave generating device 10 may be configured to generate a sound wave by transforming electrical signal. For example, the sound wave generating device 10 may be a speaker mounted within a vehicle, but it is not limited thereto. Hereinafter, the speaker 10 will be used to mean the sound wave generating device 10 for better comprehension and convenience of description. Further, the speaker 10 may be configured to output an ultrasonic wave having a substantially uniform amplitude. Herein, the ultrasonic wave may be the sound wave beyond an audio frequency range. The output of the ultrasonic wave may be simultaneously performed with the starting of the vehicle, and may be maintained while the vehicle is driven. The voice transmission starting system 1 for the vehicle according to the exemplary embodiment of the present invention may use the speaker 10 mounted within the vehicle thus omitting an additional device for generating an ultrasonic wave.

The sound wave detecting device 20 may be configured to detect a sound wave or an ultrasonic wave and generate electrical signal based on vibration of the sound wave or the ultrasonic wave. For example, the sound wave detecting device 20 may be a microphone mounted within a vehicle for voice recognition, but it is not limited thereto. Hereinafter, the microphone 20 will be used to mean the sound wave detecting device 20 for better comprehension and convenience of description. Further, the ultrasonic wave output from the speaker 10 may be input in the microphone 20. An operation of the microphone 20 for inputting the ultrasonic wave may be simultaneously performed with the output of the ultrasonic wave of the speaker 10, and may be maintained until the voice transmission device 60 is started. The voice transmission starting system 1 for the vehicle according to the exemplary embodiment of the present invention may use the microphone 20 mounted within the vehicle for voice recognition, thus omitting an additional device for recognizing an ultrasonic wave.

The central processor 30 may be configured to receive information regarding the ultrasonic wave input in the microphone 20 from the microphone 20. Further, the central processor 30 may be configured to analyze the received information regarding the ultrasonic wave, and determine a driver intention to start the voice transmission device 60. In response to determining a driver intention to start the voice transmission device 60, the central processor 30 may be configured to generate a starting signal. The central processor 30 may include a determination unit 32 and a transmitter 34. The determination unit 32 may be configured to analyze the information regarding the ultrasonic wave and determination of the driver intention, and the transmitter 34 may be configured to generate and transmit the starting signal based on the determined the driver intention.

The controller 40 may be configured to receive the starting signal transmitted from the transmitter 34. Further, the controller 40 may be configured to output a control command to start the voice transmission device 60 based on the received starting signal. In particular, the controller 30 may be a general electronic control unit (ECU) configured to operate electronic devices of the vehicle. In addition, the operating unit 50 may be operated to start the voice transmission device 60 based on the control command received from the controller 30. In other words, the voice transmission device 60 may be started by the operation of the operating unit 50.

When the voice transmission device 60 is started, the voice recognition apparatus that operates various devices based on voices may be operated. Further, a call function via the speaker 10 and the microphone 20 may be operated similar to a speaker phone. In other words, the voice transmission device 60 may be operated by the call function. Further, the microphone 20 may be connected to the voice transmission device 60, and the voice may be recognized via the micro phone 20 and the voice transmission device 60. In particular, the operation of the voice recognition apparatus and the speaker phone function via the voice recognition is apparent to a person of an ordinary skill in the art, thus a more detailed description will be omitted.

Figure 2:
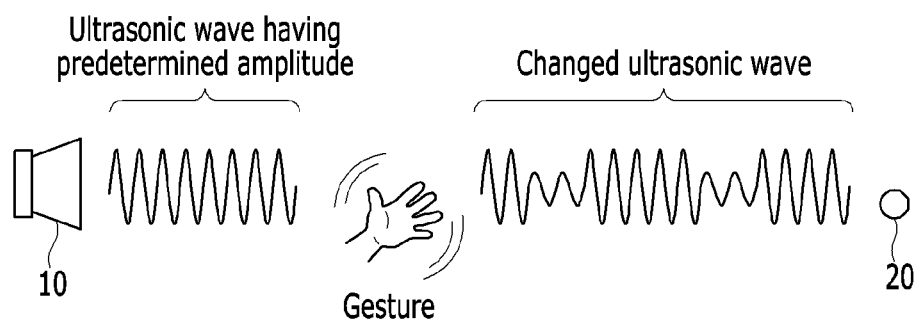
FIG. 2 is an exemplary drawing illustrating motion recognition using a sound wave generating device and a sound wave detecting device according to the exemplary embodiment of the present invention.

FIG. 2 is an exemplary drawing illustrating motion recognition using the sound wave generating device and the sound wave detecting device according to the exemplary embodiment of the present invention. As illustrated in FIG. 2, a driver intention to start the voice transmission device 60 may be determined through a gesture of the driver.

When the driver performs a gesture in a path of the ultrasonic wave output from the speaker 10 and input in the microphone 20, the amplitude of the ultrasonic wave having substantially uniform amplitude output from the speaker 10 may change by the interference of the gesture. Further, the ultrasonic wave of which the amplitude is changed may be input in the microphone 20. The central processor 30 may be configured to receive information regarding the ultrasonic wave of which the amplitude is changed from the microphone 20. Accordingly, the motion of the driver may be recognized through an analysis of the information regarding the ultrasonic wave of which the amplitude is changed. Through the recognition of the motion, the driver intention to start the voice transmission device 60 may be determined. Herein, the information of the ultrasonic wave being changed by interference with the gesture may be various characters of sound wave that include the amplitude, and the character may be sufficient when the motion of the driver is recognized by the change of the amplitude.

Moreover, the gesture that indicates the driver intention may be variously changed and set by a person of an ordinary skill in the art. For example, the gesture may be set to a motion hiding the microphone 20, a motion of lightly tapping the microphone 20, a motion of tapping the microphone 20 with a predetermined rhythm, a motion of scrubbing a surface of the microphone 20, and the like.

Figure 3:
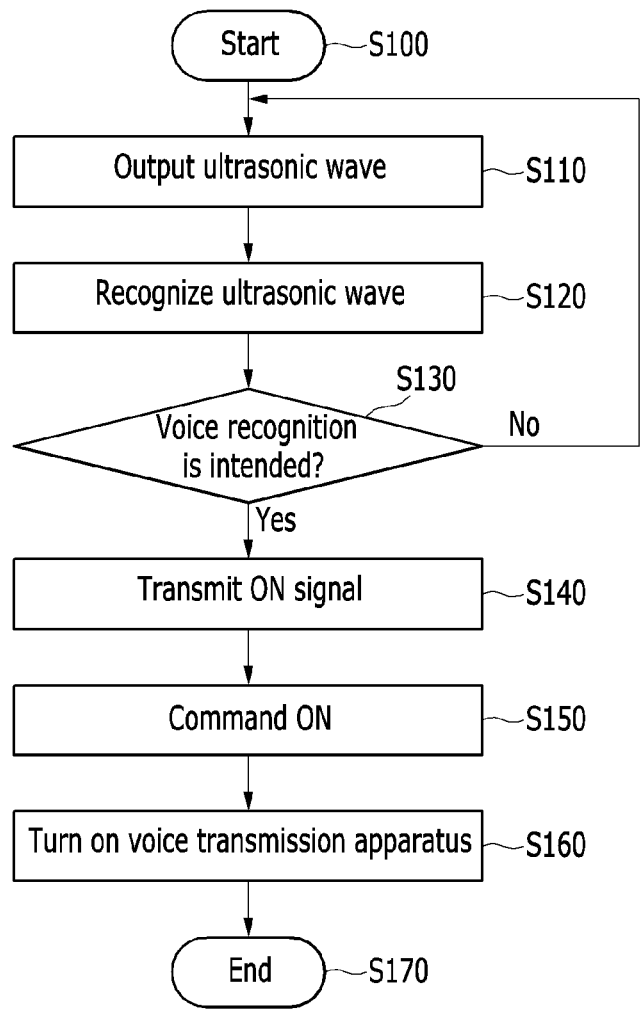
FIG. 3 is an exemplary flowchart illustrating a voice transmission starting method for a vehicle according to an exemplary embodiment of the present invention.

FIG. 3 is an exemplary flowchart illustrating a voice transmission starting method for a vehicle according to an exemplary embodiment of the present invention. When the vehicle is started (S100), an ultrasonic wave having a substantially uniform amplitude may be output via the speaker 10 (S110). The ultrasonic wave output via the speaker 10 may be input to the microphone 20, and the central processor 30 may be configured to receive information regarding the ultrasonic wave from the microphone 20 (S120). In particular, a motion of a driver may be selectively performed on a path of the ultrasonic wave transmitted from the speaker 10 to the microphone 20.

When the information regarding the ultrasonic wave is recognized by the central processor 30 (S120), the central processor 30 may be configured to start the voice transmission device 60, and determine a driver intention to perform voice recognition based on the information regarding the recognized ultrasonic wave (S130). In response to determining that there is no driver intention to perform voice recognition, the steps of outputting and recognizing the ultrasonic wave may be repeated (S110 and S120). In particular, the output and the input of the ultrasonic wave may be performed while the vehicle is driven.

Further, in response to determining the driver intention to perform voice recognition, the central processor 30 may be configured to generate a starting signal to turn on the voice transmission device 60 and transmit the generated starting signal to perform the voice recognition (S140). When the starting signal is transmitted, the controller 40 may be configured to receive the transmitted starting signal, and output a control command to start the voice transmission device 60 based on the received starting signal (S150). Further, the voice transmission device 60 may be started by the operating unit 50 that may receive the output control command (S160).

Moreover, when the starting of the vehicle is off (S170), the operation of the voice transmission device 60 and the operation of the voice transmission starting system 1 may be terminated. Further, the termination of the operation of the voice transmission starting system 1 while driving may be performed by a separate operation of the driver. Further, the termination of the call function via the speaker 10 and the microphone 20, such as a speaker phone, may be performed by a call termination of a call counterpart.

According to the exemplary embodiment of the present invention, the voice transmission device 60 may be started through the recognition of the motion, omitting the need for a driver to press a button to start a voice transmission device. Further, a forward gaze may be maintained, maintaining safe driving. In addition, the existing speaker 10 and microphone 20 mounted within a vehicle may be used without a configuration change, and the button for starting the voice transmission device 60 may be omitted, thus reducing cost and improving space availability.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A voice transmission starting system for a vehicle, comprising:
    a memory configured to store program instructions;
    a speaker mounted within the vehicle and configured to output an ultrasonic wave having a substantially uniform amplitude;
    a microphone mounted within the vehicle and configured to receive the ultrasonic wave; and
    a processor configured to execute the program instructions, the program instructions when executed configured to:
        control the speaker to output the ultrasonic wave;
        control the microphone to receive the ultrasonic wave;

recognize the ultrasonic wave received by the microphone as an input;
analyze the input to extract information regarding the ultrasonic wave; and
output a signal based on the information regarding the ultrasonic wave to start a voice transmission device, wherein
operation of the microphone is simultaneously started with operation of the speaker and the operation of the microphone and the speaker is maintained until the voice transmission device is started,
the microphone is arranged to face the speaker with a space therebetween in which a straight pass is disposed,
the processor is further configured to recognize an amplitude change of the ultrasonic wave induced by an interference of a gesture which is performed at a position on the straight pass between the microphone and the speaker as a request for starting the voice transmission device, and
in response to recognizing the amplitude change of the ultrasonic wave, the processor is further configured to output the signal to start the voice transmission device.

2. The voice transmission starting system of claim 1, wherein the operation of the microphone and the speaker starts.

3. A voice transmission starting method for a vehicle, comprising:
controlling, by a controller, a speaker to output an ultrasonic wave having substantially uniform amplitude;
receiving, by a microphone, the output ultrasonic wave;
recognizing, by the controller, the output ultrasonic wave received by the microphone as an input; and
generating, by the controller, a signal based on information regarding the recognized ultrasonic wave and transmitting the generated signal to start a voice transmission device, wherein
operation of the microphone is simultaneously started with operation of the speaker and the operation of the microphone and the speaker is maintained until the voice transmission device is started,
the microphone is arranged to face the speaker with a space therebetween in which a straight pass is disposed,
the controller recognizes an amplitude change of the ultrasonic wave induced by an interference of a gesture which is performed at a position on the straight pass between the microphone and the speaker as a request for starting the voice transmission device, and
in response to recognizing the amplitude change of the ultrasonic wave, the controller outputs the signal to start the voice transmission device.

4. A non-transitory computer readable medium containing program instructions executed by a controller, the computer readable medium comprising:
program instructions that control a speaker to output an ultrasonic wave having substantially uniform amplitude;
program instructions that control a microphone to receive the output ultrasonic wave;
program instructions that recognize the output ultrasonic wave as an input; and
program instructions that generate a signal based on information regarding the recognized ultrasonic wave and transmitting the generated signal to start a voice transmission device, wherein
operation of the microphone is simultaneously started with operation of the speaker and the operation of the microphone and the speaker is maintained until the voice transmission device is started,
the microphone is arranged to face the speaker with a space therebetween in which a straight pass is disposed,
the controller recognizes an amplitude change of the ultrasonic wave induced by an interference of a gesture which is performed at a position on the straight pass between the microphone and the speaker as a request for starting the voice transmission device, and
in response to recognizing the amplitude change of the ultrasonic wave, the controller outputs the signal to start the voice transmission device.

* * * * *